July 24, 1923.
C. W. HINKLE
GATE HINGE
Filed May 24, 1922
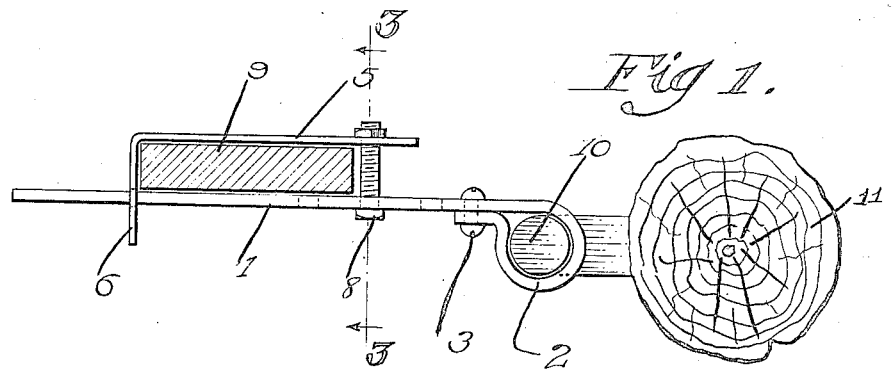
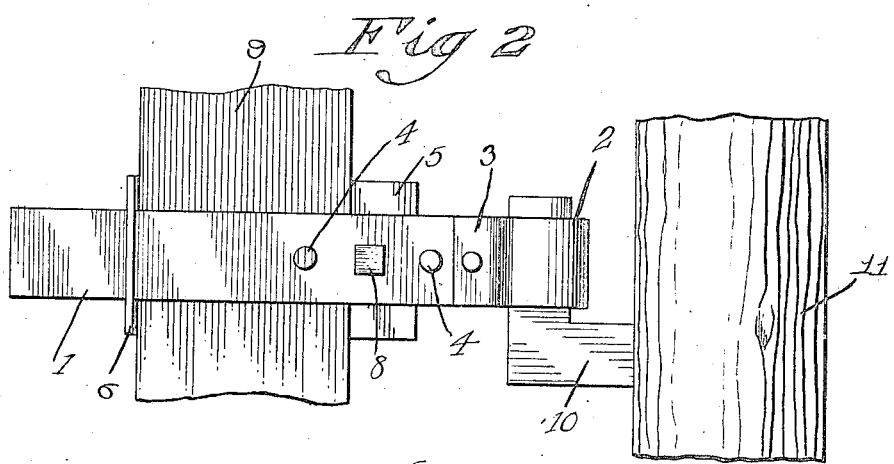
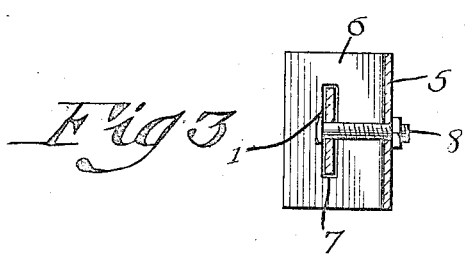
Inventor
C. W. Hinkle,
By
Attorney Patented July 24, 1923.

1,462,759

UNITED STATES PATENT OFFICE.

CHARLES W. HINKLE, OF RUSHVILLE, INDIANA.

GATE HINGE.

Application filed May 24, 1922. Serial No. 563,362.

*To all whom it may concern:*

Be it known that I, CHARLES W. HINKLE, a citizen of the United States, residing at Rushville, in the county of Rush and State of Indiana, have invented a new and useful Gate Hinge, of which the following is a specification.

This invention aims to provide a simple means whereby a gate may be held on one member of a hinge securely but releasably, the device being so constructed that the gate may be adjusted with respect to the post or other support whereon the gate swings.

It is within the province of the disclosure to improve generally and to enhance the utility of devices of that type to which the invention appertains.

With the above and other objects in view, which will appear as the description proceeds, the invention reside in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Figure 2 is an elevation; Figure 3 is a section on the line 3—3 of Figure 1.

The device forming the subject matter of this invention is made of metal and includes a main bar 1 provided at one end with an eye 2. The eye 2 may be fashioned in various ways. As shown, but not of necessity, one end of the bar 1 is bent upon itself to form the eye 2, the end of that portion of the main bar which forms the eye being connected to the body portion of the bar by a securing element 3, such as a rivet. There are openings 4 in the main bar 1, the openings being spaced apart longitudinally of the bar. An auxiliary bar 5 is disposed approximately parallel to the main bar 1 and has a rectangular arm 6 provided with an opening 7 wherein the main bar 1 is slidable for adjustment. That end of the auxiliary bar 5 which is remote from the arm 6 carries a securing element, such as a bolt 8 adapted to be mounted in any of the openings 4 of the main bar 1. The numeral 9 marks the vertical end member of a gate, the member 9 being received between the bars 5 and 1. The eye 2 may be mounted on a hinge pintle 10 carried by a post 11, or other support.

It will be obvious that by tightening the bolt 8, the gate member 9 will be clamped between the bars 1 and 5. The bolt 8 may be mounted in any of the openings 4, the arm 6 of the auxiliary bar 5 sliding on the main bar 1, and, in this way, the distance between the member 9 of the gate and the point 10 of suspension of the gate may be adjusted. The auxiliary bar 5 preferably is somewhat wider than the main bar 1, so that the opening 7 may be fashioned in the arm 6. Further, owing to the fact that the bar 5 is wider than the bar 1, the bar 5 has an increased bearing surface on the member 9 of the gate.

What is claimed is:—

In a device of the class described, a main bar provided with suspension means; an auxiliary bar disposed approximately parallel to the main bar and supplied with an angularly disposed arm having an opening wherein the main bar is received slidably, one of the bars being provided with a plurality of openings spaced longtudinally of the said bar; and a bolt mounted in the other bar and adapted to be received in any of the last specified openings.

In testimony that I claim the foregoing as my own, I have hereto affixed my signature in the presence of two witnesses.

CHARLES W. HINKLE.

Witnesses:
WILBUR STIERS,
CHARLES G. NEWKIRK.